July 15, 1969 N. HOGLUND 3,455,289
APPARATUS FOR FORMING CONTOURS ON WORKPIECES
Filed Aug. 18, 1965 5 Sheets-Sheet 1
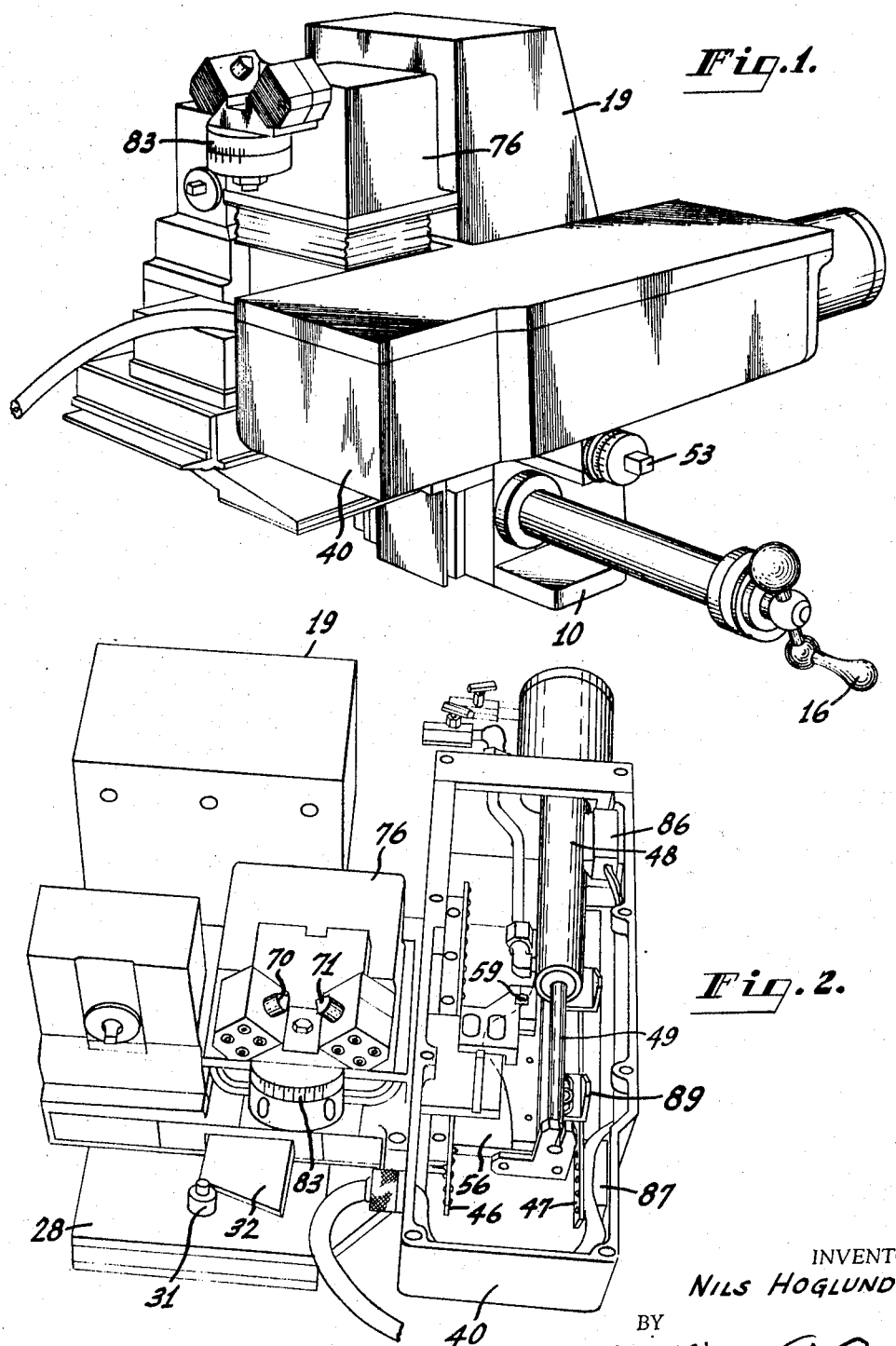
INVENTOR.
NILS HOGLUND
BY
William A. Zaleske
Attorney

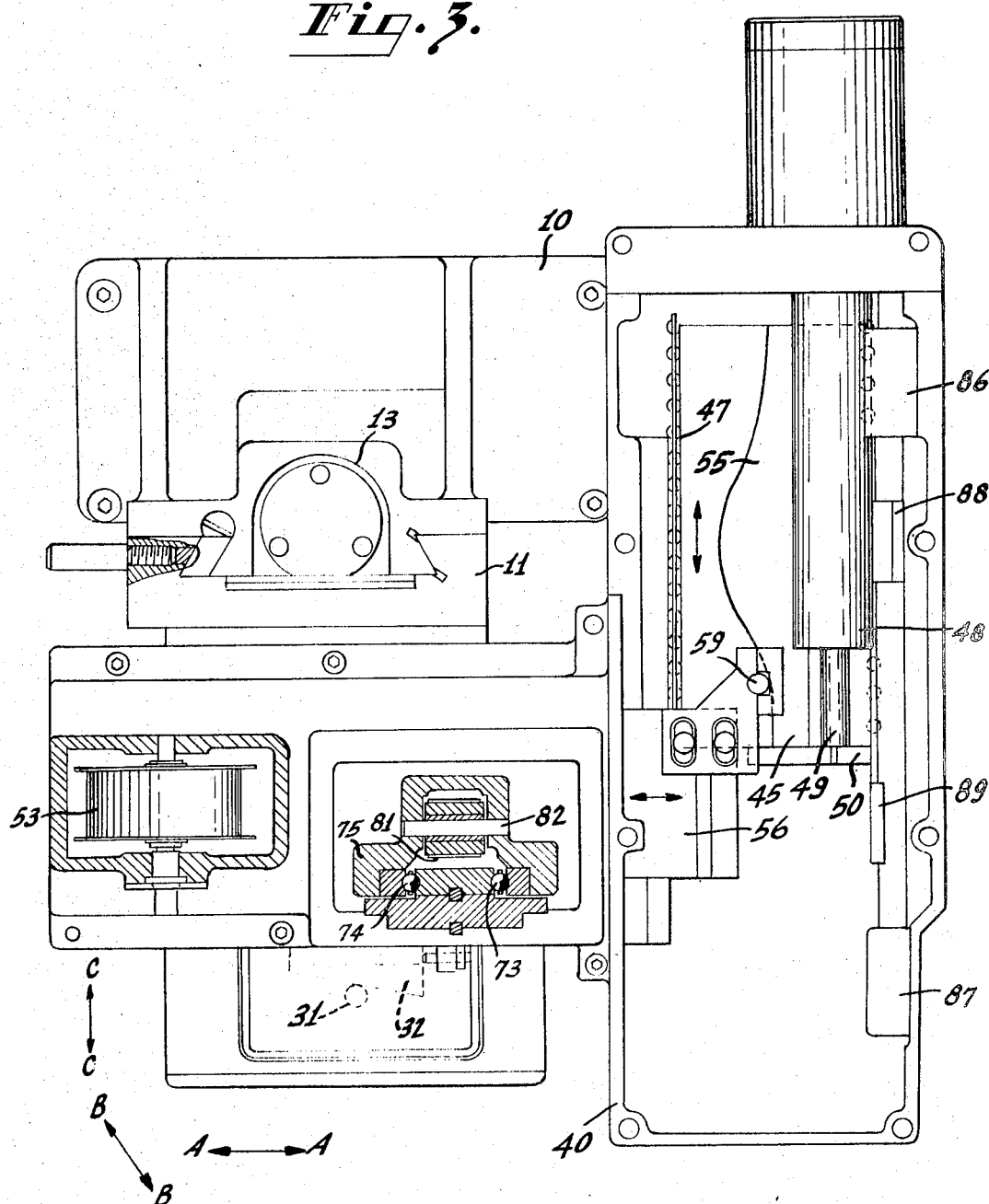

July 15, 1969  N. HOGLUND  3,455,289
APPARATUS FOR FORMING CONTOURS ON WORKPIECES
Filed Aug. 18, 1965  5 Sheets-Sheet 3
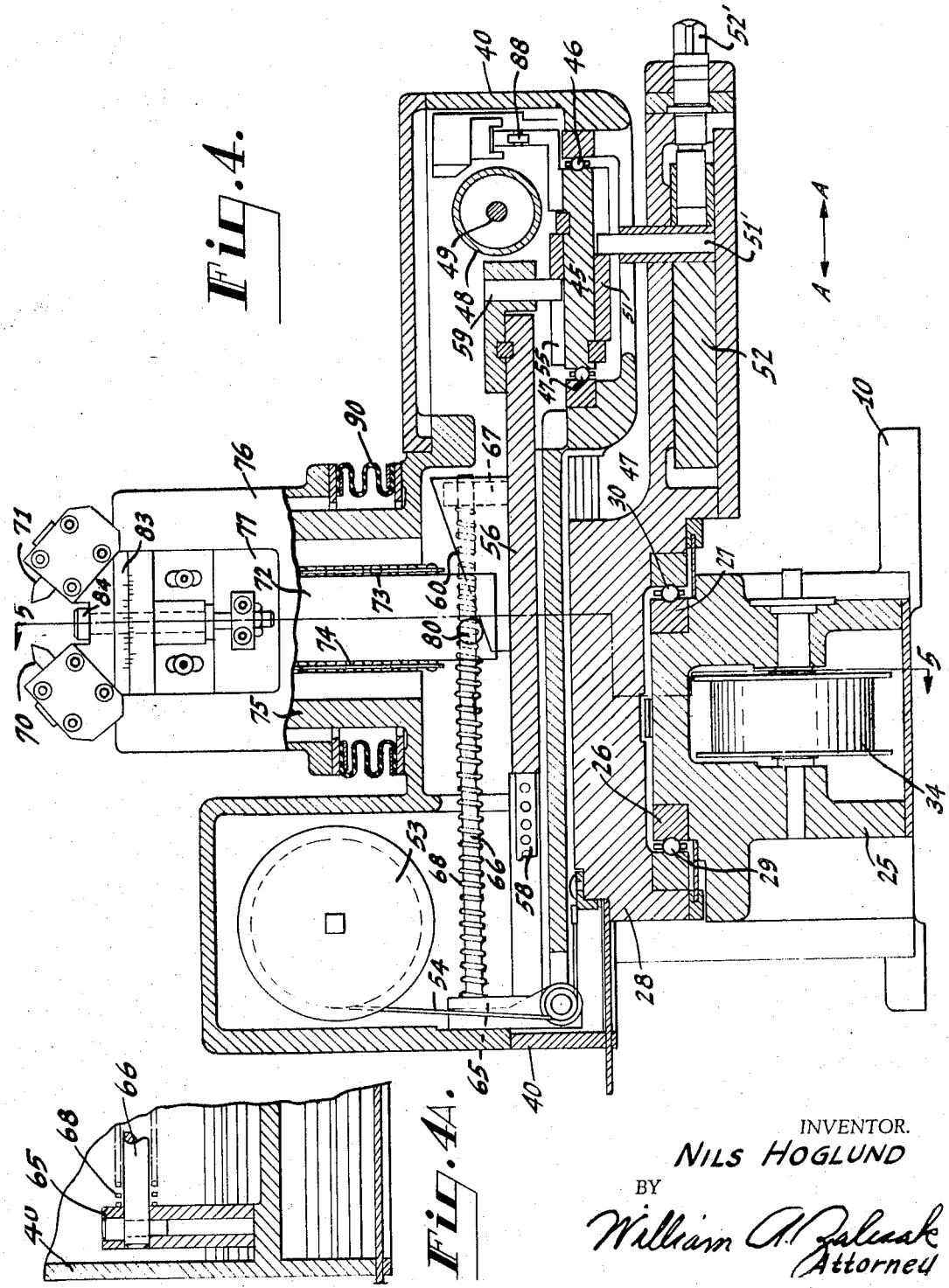
INVENTOR.
NILS HOGLUND
BY
William A. Zaleski
Attorney

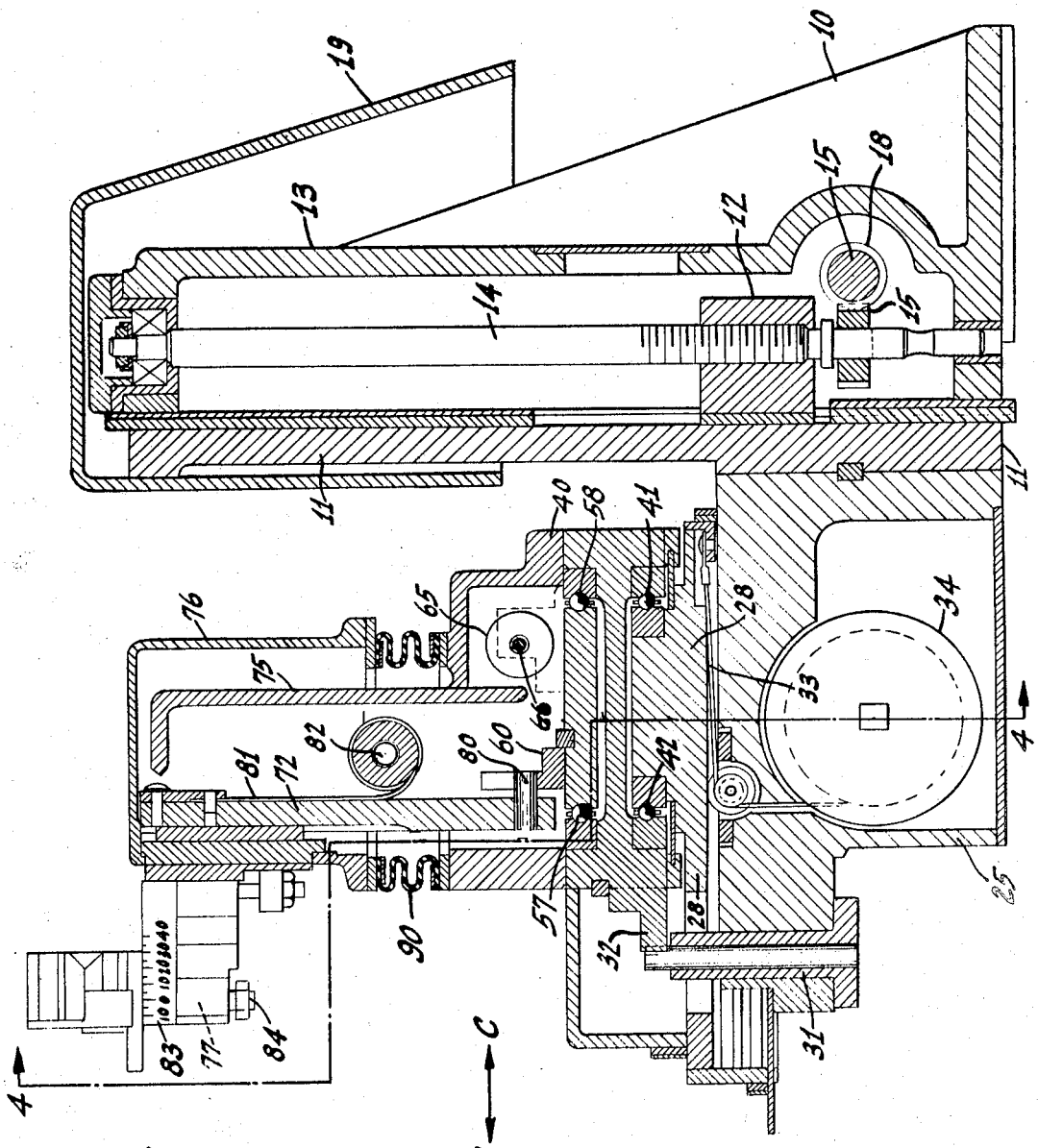

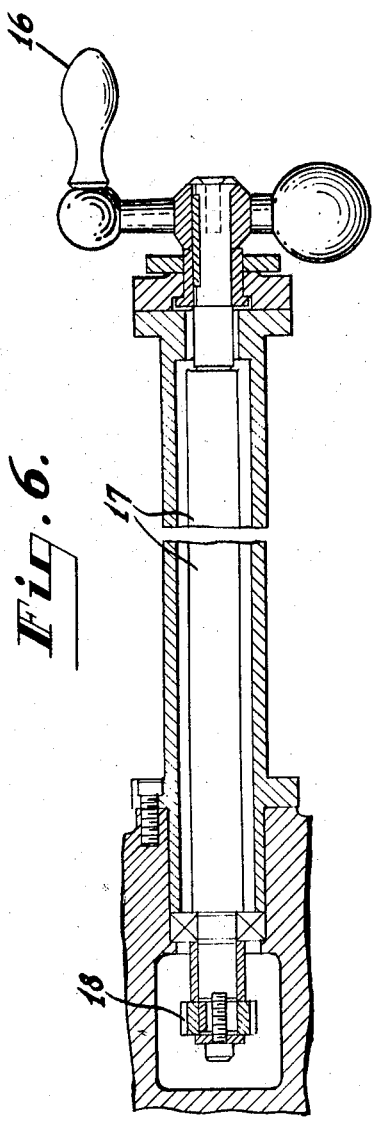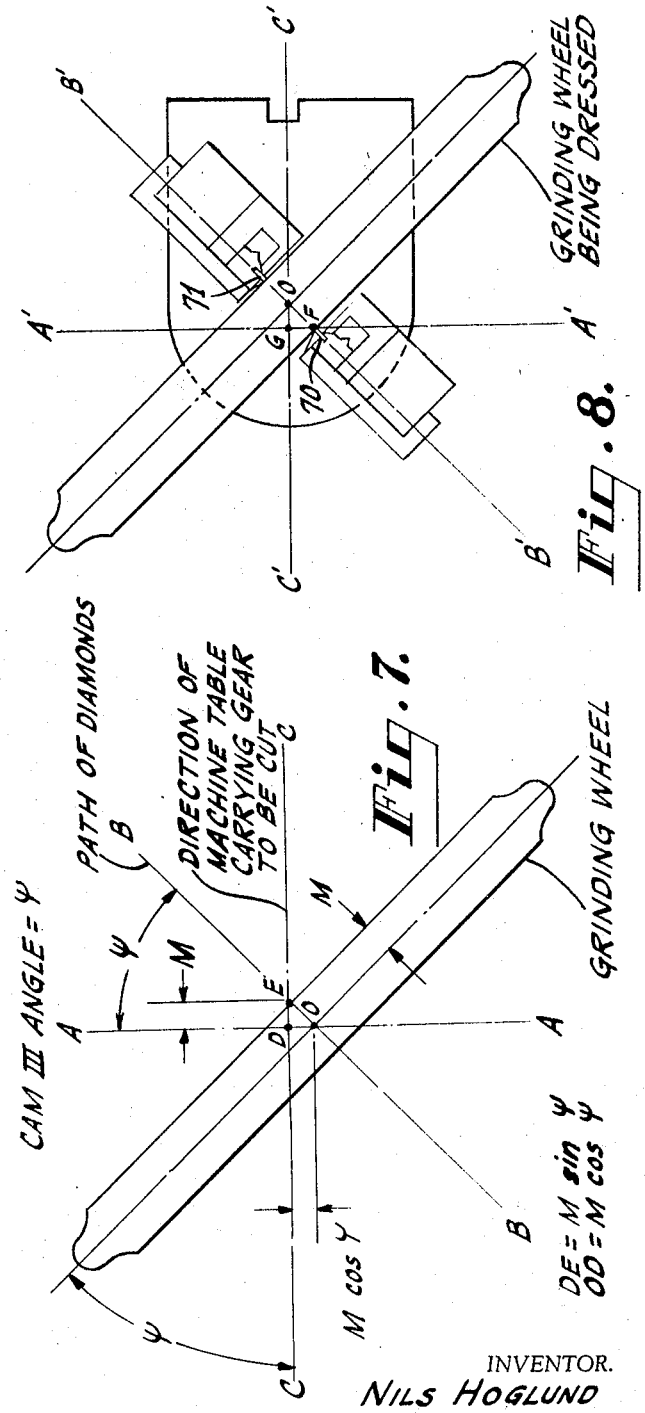

3,455,289
APPARATUS FOR FORMING CONTOURS ON
WORKPIECES
Nils Hoglund, Short Hills, N.J., assignor to Hoglund Engineering and Manufacturing Company, Inc., Berkeley Heights, N.J.
Filed Aug. 18, 1965, Ser. No. 480,737
Int. Cl. B28d 1/16
U.S. Cl. 125—11   4 Claims

ABSTRACT OF THE DISCLOSURE

A grinding wheel dressing apparatus for forming involute forms on grinding wheels used for plunge grinding the complete form on helical and spur gears. A housing slide movable in one direction carries a dresser housing slide movable in a transverse direction. Dressing tools are mounted on a slide on the dresser housing. A slide is mounted on the dresser housing and carries a feed cam and a contour cam. The feed cam cooperates with a follower on the housing slide and a second feed cam in the housing cooperates with a follower on the base. This causes a resultant movement of the housing and the dressing tools. Other slides, cams and followers cause the dressing tools or diamonds to move along a predetermined contour path parallel to the axis of rotation of the grinding wheel being dressed regardless of the angle of the grinding wheel axis with reference to the grinding machine table carrying the gear to be cut.

My invention relates to a new and improved apparatus for forming contours and more particularly to wheel dressing apparatus for dressing grinding wheels on gear grinding machines particularly for putting involute forms on grinding wheels used for plunge grinding the complete form on helical gears as well as spur gears.

In conventional wheel dressing apparatus presently available, it is necessary to reposition or rotate the whole dressing apparatus around the center line between the two dressing diamonds each time a gear having a different helix angle is to be ground. To permit the dressing apparatus to be swung around to the different helix angles, a great deal of clearance is required on the grinding machine to allow for the repositioning of the dressing apparatus. Further, a great deal of time is required to accurately position the dressing apparatus so that the path of the dressing diamonds will be normal to the sides of the grinding wheel when the grinding wheel is rotated for forming helical gears having different helix angles.

It is therefore an object of my invention to provide a new and improved wheel dressing apparatus for dressing grinding wheels on gear grinding machines used for forming involute forms on grinding wheels used to grind the complete form on helical gears as well as spur gears.

More particularly it is an object of my invention to provide such an apparatus which can be mounted in fixed position relative to the grinding wheel machine table while being capable of producing movement of the dressing tools or diamonds in a path perpendicular to the sides of the grinding wheel to be dressed regardless of the angle to which the axis of the grinding wheel is rotated for grinding helical gears having different helix angles.

In accordance with the invention the apparatus includes a vertically adjustable base upon which is mounted a housing slide movable in one direction. A dresser housing is slidably mounted on the housing slide and is movable in a direction transverse to the movement of the housing slide. Diamonds or dressing tools are mounted on a slide on the dresser housing. The dresser housing is provided with a power-driven slide carrying a feed cam and a contour cam. The feed cam cooperates with a follower on the housing slide and a second feed cam on the housing cooperates with a follower on the base. This arrangement causes a resultant movement of the housing and diamonds. The diamond slide through associated slides and other cams and followers moves to cause the diamonds to move along a predetermined contour path. Thus the diamonds can be made to move along a path parallel to the axis of rotation of the grinding wheel being dressed regardless of the angle of the grinding wheel axis with reference to the movement of the grinding machine table carrying the gear to be cut. Changing of the contour and feed cams makes it possible to cause movement of the dressing diamonds in any resultant path parallel to the axis of the grinding wheel regardless of its angle to the machine table when the grinding wheel axis angle is changed to cut different pitch helical gears with tooth shapes of different contour.

Referring to the drawings,

FIGURE 1 shows in perspective an apparatus made according to my invention,

FIGURE 2 is another view in perspective of the apparatus shown in FIGURE 1 with parts removed to show details of construction, FIGURE 3 is a plan view of the apparatus shown in FIGURES 1 and 2 with parts removed and partially in section showing details of construction, FIGURE 4 is a section taken along the line 4—4 of FIGURE 5, FIGURE 4a is a sectional detail of FIGURE 4, FIGURE 5 is a section taken along the line 5—5 of FIGURE 4, FIGURE 6 is a section showing the adjusting screw for moving the elevating slide, FIGURE 7 is a schematic showing a grinding wheel to be dressed and direction of movement of the machine table and dressing diamonds, and FIGURE 8 is a diagram showing the relationship of the dressing diamonds and the grinding wheel to be dressed looking upwardly from the machine table.

Referring now to FIGURES 4, 5 and 6, apparatus made according to my invention includes a base 10 supporting an elevating slide 11. The slide 11 has attached thereto a nut 12 cooperating with the screw 14 rotatably mounted in the housing 13 on base 10. A gear 15 is fastened to the screw 14. The gear 15 is engaged by gear 18 mounted on spindle 17 and rotated by means of a crank 16. This assembly is provided with a cover member 19 which is attached to slide 11. As crank 16 is rotated the slide 11 is moved up and down in housing 13 to adjust the position of the entire apparatus on the grinding machine bed.

The dresser housing assembly includes a dresser base 25 secured to slide 11. A housing slide 28 is slidably mounted on the dresser base by means of ball bearing assemblies 29 and 30. Mounted on the base 25 is a cam follower 31 contacting a feed cam 32. Biasing spring 33 attached to the housing slide 28 and the spring reel 34 (FIGURE 5). The biasing spring 33 and the spring reel 34 maintain cam 32 and follower 31 in contact with each other. The above-described mechanism controls movement of the housing assembly in a manner to be described.

The dresser housing 40 is slidably supported on the housing slide 28 by means of ball bearing assemblies 41 and 42 (FIGURE 4).

CAM SLIDE

To control movement of housing 40 on ball bearing assemblies 41 and 42, there is provided a cam slide and follower assembly mounted in the housing 40.

The cam slide 45 is mounted on ball bearing assemblies 46 and 47 (FIGURES 3 and 4). This cam slide 45 is activated by hydraulic cylinder 48 fastened at one end to housing 40. The cylinder rod 49 is fastened to cam slide 45 by means of a bracket 50. The hydraulic cylinder 48 controls movement of the cam slide in the direction indicated by the arrow.

Mounted on the underside of cam slide 45 is a feed cam 51 which is in contact with the follower 51'. This follower is mounted on an adjustable follower slide 52 mounted on housing slide 28. Slide 52 can be adjusted by screw 52'. The housing 40 is biased by means of spring reel 53 in the housing and having wire 54 attached to the housing slide 28. This causes the housing 40 to be biased so that the follower 51' is maintained in contact with feed cam 51.

Mounted on top of cam slide 45 is a contour cam 55. A contour ratio slide 56 is mounted in ball bearing assemblies 57 and 58. A follower 59 is mounted at one end of slide 56 and contacts the contour cam 55. A contour ratio cam 60 is mounted on top of the contour ratio slide.

To maintain cam 55 and follower 59 in contact, I provide a biasing mechanism. This includes a block 65 (FIGURES 4 and 4a) having extending therefrom a spring guide and support 66 slidably extending through block 67 fixed to slide 56. A compressed biasing spring 68 is mounted on the guide 66 between blocks 65 and 67.

DIAMOND SLIDE

The cutting tools or dressing diamonds 70 and 71 are mounted on the diamond slide 72 slidably supported by ball bearing assemblies 73 and 74 within the diamond slide housing 75. Housing 75 is in turn supported on housing 40. A cover member 76 and diamond holder 77 are fastened to slide 72. Diamond slide 72 has secured to its lower end a follower 80 in contact with ratio cam 60. To insure contact between the cam 60 and follower 80 there is provided a bias spring 81 having one end fixed to slide 72 and its other end to spring rod 82 mounted in the diamond slide housing 75.

The diamond holder 77 has a rotatable part 83 which can be rotated around bolt 84. This arrangement provides a means for locating the diamonds at the proper helix angle so that the center line of the diamonds will be located in a plane parallel to B—B shown in FIGURES 7 and 8.

A flexible dust shield 90 extends between housing 40 and cover 76.

OPERATION

The operation of the apparatus is as follows.

When the hydraulic cylinder 48 is energized, the cam slide 45 is caused to move back and forth as indicated by the arrow in FIGURE 3. The limits of movement of the slide 45 are controlled by the limit switches 86 and 87 which are operated when trippers 88 and 89 on slide 45 contact the switches at either limit. These switches control the flow of fluid to the cylinder 48 by conventional means not shown.

As the slide 45 moves back and forth, the housing 40 as a result of contact between the feed cam 51 and follower 51' moves along the path A—A (FIGURES 3 and 4) as the result of biasing spring 53 which pulls the housing 40 and feed cam 51 against the follower 51'. At the same time the cam 32 and follower 31 maintained in contact by biasing spring 33 and spring reel 34 causes the housing 40 to move along the line C—C (FIGURES 3 and 4). The amount of the movement in each direction is determined by the angle of the cams 32 and 51. A resultant movement of the housing 40 occurs along the line B—B (FIGURES 3 and 7). The resultant movement B—B can be changed by changing the shape of the cams. This resultant movement and changing the position of the cams eliminates the need for rotating the dressing apparatus.

The movement of the diamond cutters is controlled by the slide 56, contour cam 55 and ratio cam 60. Changes in these last two cams will change the contour path. It is understood that each diamond forms only one-half of the contour on the grinding wheel.

As the slide 45 moves back and fourth, slide 56 will move from left to right as shown in FIGURE 4. As slide 56 is moved to the left, follower 80 is moved upwardly and downwardly in accordance with the shape of contour cam 55, as the housing 40 moves along the path B—B. Changing either cam 55 or cam 60 changes the shape of the contour.

To explain in more detail the movement of the diamonds and their forming action on the grinding wheel being dressed reference is made to FIGURES 4 and 8.

Diamonds 70 and 71 are fixed to the diamond slide 72 and with reference to each other. Both must follow the same path along the line B'—B' as shown in FIGURE 8. Only one of the diamonds is in contact at any one time with the grinding wheel being dressed.

Referring to FIGURE 8, as diamond 70 moves upwardly along the path B'—B', it will come into contact with the surface of one side of the wheel being dressed and follow a contour path having the shape of the periphery of the wheel. The other diamond 71 will of course move away from the grinding wheel. When the diamond reaches the high point of the periphery of the wheel, the electric tripper will cause the apparatus to reverse iself. Diamond 70 will take a reverse path. When again it reaches its starting position, it continues to move along the path B'—B' and as it moves away from the surface being dressed, diamond 71 comes into contact with the other surface of the wheel being dressed following a contour path the reverse of that followed during the dressing operation of diamond 70. Thus a completed dressing operation results. It is understood that the wheel being dressed is rotated during dressing operations.

What is claimed is:

1. A grinding wheel dressing apparatus including a base,
   a housing slide mounted on said base and movable in one direction,
   a housing slidably mounted on said housing slide and movable in a direction transverse to said one direction whereby simultaneous movement of said slide and said housing relative to said slide causes movement of said housing along a resultant path,
   a tool slide on said housing movable normally of said directions,
   a cam slide on said housing,
   a feed cam on one side of said cam slide and a follower on said housing slide and contacting said feed cam for controlling movement of said housing on said housing slide,
   a contour cam on the other side of said cam slide,
   another slide on said housing having a cam thereon and a follower contacting said contour cam,
   a follower on said tool slide and contacting the cam on said another slide,
   a feed cam fixed to and extending externally from the slidable housing, a follower fixed to said base and directly contacting said last feed cam,
   means for moving said cam slide, and
   biasing means for biasing all of said elements in yielding relationship.

2. Apparatus for forming contours including a base,
   a housing slide mounted on said base and movable in one direction,
   a housing slidably mounted on said housing slide,
   a cam slide on said housing,
   a feed cam on one side of said cam slide,
   a follower on said housing slide in direct contact with said feed cam,
   said feed cam and follower controlling movement of said housing on said housing slide, a feed cam fixed to said housing and extending externally thereof,
a follower on said base in direct contact with said last feed cam, said last feed cam and follower on said base controlling movement of said housing slide,
a tool slide on said housing,
a contour cam on the other side of said cam slide,
connections between said tool slide and said contour cam for controlling movement of said tool slide,
means for moving said cam slide, and
biasing means for biasing said cams and followers against each other.

3. A grinding wheel dressing apparatus including a base,
a housing slide mounted on said base and movable in one direction,
a housing slidably mounted on said housing slide and movable in a direction transverse to said one direction,
a cam slide on said housing,
a feed cam on one side of said cam slide,
a follower fixed to said housing slide and in direct contact with said feed cam,
said feed cam and follower controlling movement of said housing on said housing slide,
a feed cam fixed to said housing and extending externally thereof,
a follower on said base in contact with said last feed cam, said last feed cam and follower on said base controlling movement of said housing slide,
a tool slide on said housing movable normally of said directions,
a contour cam on the other side of said cam slide,
another slide on said housing having a cam thereon and a follower contacting said contour cam,
connections between the cam on said another slide and said tool slide,
means for moving said cam slide, and
biasing means for biasing said cams and followers against each other.

4. A grinding wheel dressing apparatus including a base,
a housing slide mounted on said base and movable in one direction,
a housing slidably mounted on said housing slide and movable in a direction transverse to said one direction whereby said housing can move in a resultant direction,
a tool slide on said housing movable normally of said directions,
a cam slide on said housing,
a ratio cam on one side of said cam slide,
connections between said housing slide and said ratio cam for controlling movement of said housing,
a contour cam on the other side of said cam slide,
another slide on said housing having a cam thereon and a follower thereon contacting said contour cam,
connections between the cam on said another slide and said tool slide,
a cam fixed to said housing and extending externally thereof,
a follower on said base in direct contact with said last cam for controlling movement of said housing slide,
means for moving said cam slide, and
biasing means for biasing all of said cams and followers against each other.

References Cited

UNITED STATES PATENTS

| | | | |
|---|---|---|---|
| 2,658,497 | 11/1953 | Hoglund | 125—11 |
| 2,768,619 | 10/1956 | Hoglund | 125—11 |
| 2,936,750 | 5/1960 | Hoglund | 125—11 |
| 3,169,448 | 2/1965 | Hoglund. | |

OTHER REFERENCES

Design News, "Stacked Cam Control 3-Dimensional Milling," p. 16, July 7, 1958.

HAROLD D. WHITEHEAD, Primary Examiner